United States Patent
McGinley

(10) Patent No.: US 7,059,862 B2
(45) Date of Patent: Jun. 13, 2006

(54) HITTING TRAINER

(76) Inventor: Michael L. McGinley, 4013 W. 69th St., Prairie Village, MO (US) 66208

( * ) Notice: Subject to any disclaimer, the term of this patent is extended or adjusted under 35 U.S.C. 154(b) by 143 days.

(21) Appl. No.: 10/175,647

(22) Filed: Jun. 19, 2002

(65) Prior Publication Data

US 2003/0235809 A1   Dec. 25, 2003

(51) Int. Cl.
*G09B 19/00* (2006.01)

(52) U.S. Cl. .................................. 434/247

(58) Field of Classification Search ............... 434/247; 473/451, 453, 457, 458; 206/315.1, 315.9, 206/579
See application file for complete search history.

(56) References Cited

U.S. PATENT DOCUMENTS

| | | | | |
|---|---|---|---|---|
| 2,091,512 A | * | 8/1937 | Marsh | 473/203 |
| 2,690,338 A | * | 9/1954 | De Brocke | 473/203 |
| 2,925,273 A | * | 2/1960 | Pratt | 473/451 |
| 3,110,494 A | * | 11/1963 | Morgan | 473/458 |
| 3,353,824 A | * | 11/1967 | Hamson | 473/458 |
| 3,819,038 A | * | 6/1974 | Candor et al. | 206/579 |
| 3,830,362 A | * | 8/1974 | Tassone et al. | 206/223 |
| 3,933,241 A | * | 1/1976 | Tassone et al. | 206/579 |
| 4,050,694 A | * | 9/1977 | Domroski | 473/429 |
| 4,181,302 A | * | 1/1980 | Sexton et al. | 273/317 |
| 4,284,277 A | * | 8/1981 | Leonard et al. | 473/471 |
| 4,693,402 A | * | 9/1987 | Comeau | 224/604 |
| 4,793,532 A | * | 12/1988 | Cash | 224/584 |
| 4,890,731 A | * | 1/1990 | Mroz | 206/315.9 |
| 4,958,729 A | * | 9/1990 | Wright | 206/315.1 |
| 4,991,838 A | * | 2/1991 | Groves | 473/451 |
| 5,407,193 A | * | 4/1995 | McGinley | 473/451 |
| 5,427,376 A | * | 6/1995 | Cummings et al. | 473/201 |
| 5,536,004 A | * | 7/1996 | Wiseman | 273/26 R |
| 5,695,067 A | * | 12/1997 | Harvey | 206/579 |
| 5,810,215 A | * | 9/1998 | Plymell | 223/78 |
| 5,836,828 A | * | 11/1998 | Sinton | 473/205 |
| 5,975,293 A | * | 11/1999 | Fowler | 206/315.9 |
| 6,045,465 A | * | 4/2000 | Alfano et al. | 473/457 |
| 6,231,459 B1 | * | 5/2001 | Pettigrew et al. | 473/351 |
| 6,254,498 B1 | * | 7/2001 | Tyner | 473/437 |
| 6,287,221 B1 | * | 9/2001 | Pino | 473/564 |
| 6,656,054 B1 | * | 12/2003 | Ulrich | 473/201 |

* cited by examiner

*Primary Examiner*—Kurt Fernstrom
(74) *Attorney, Agent, or Firm*—Shughart Thomson & Kilroy PC

(57) ABSTRACT

A hitting training kit is provided which includes equipment to hit a baseball and instructions to assist a user in learning the technique of hitting a baseball a portion of said instructions appearing on the baseball bat of the kit to permit the user to review the sequence of user movements for hitting a baseball.

8 Claims, 2 Drawing Sheets

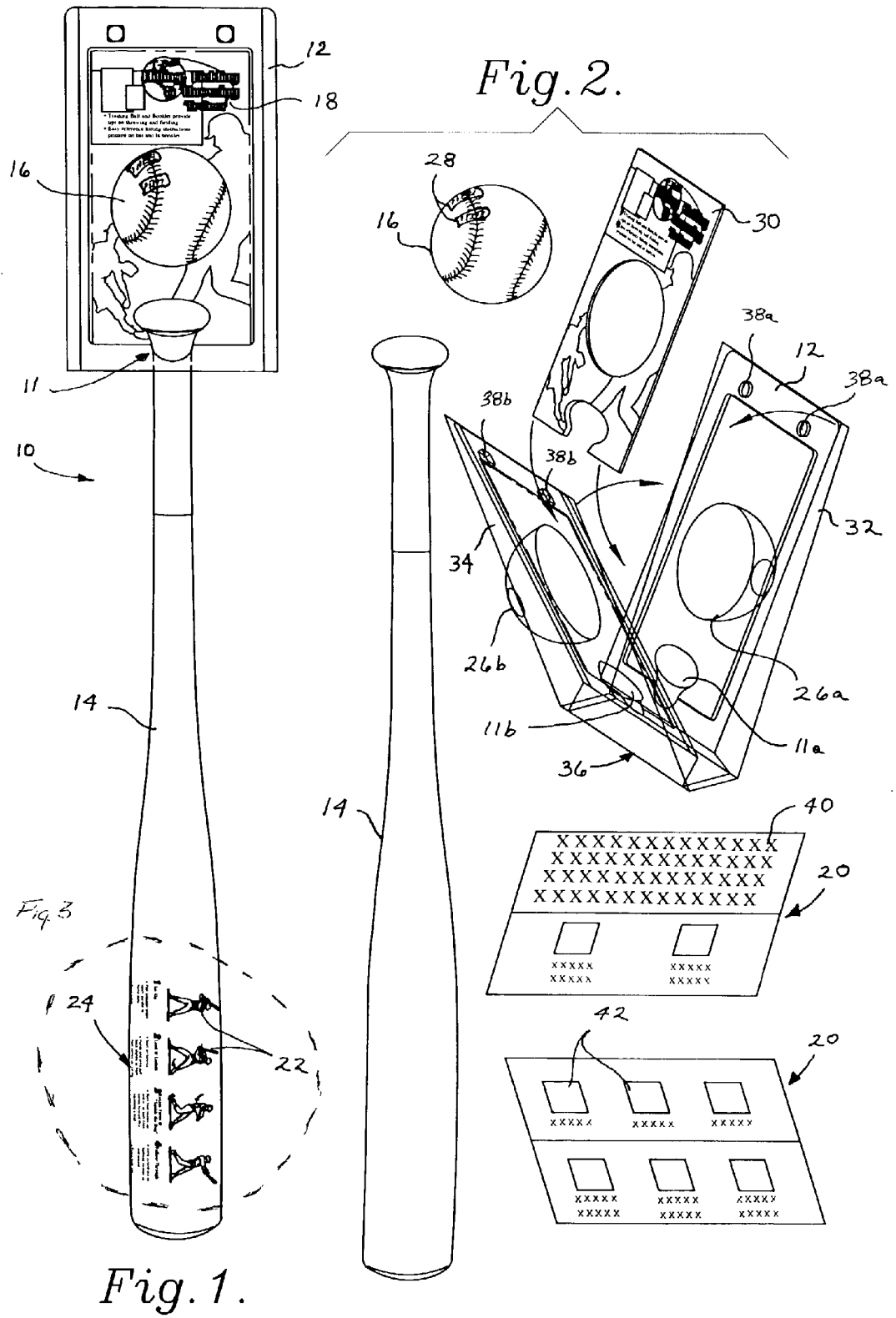

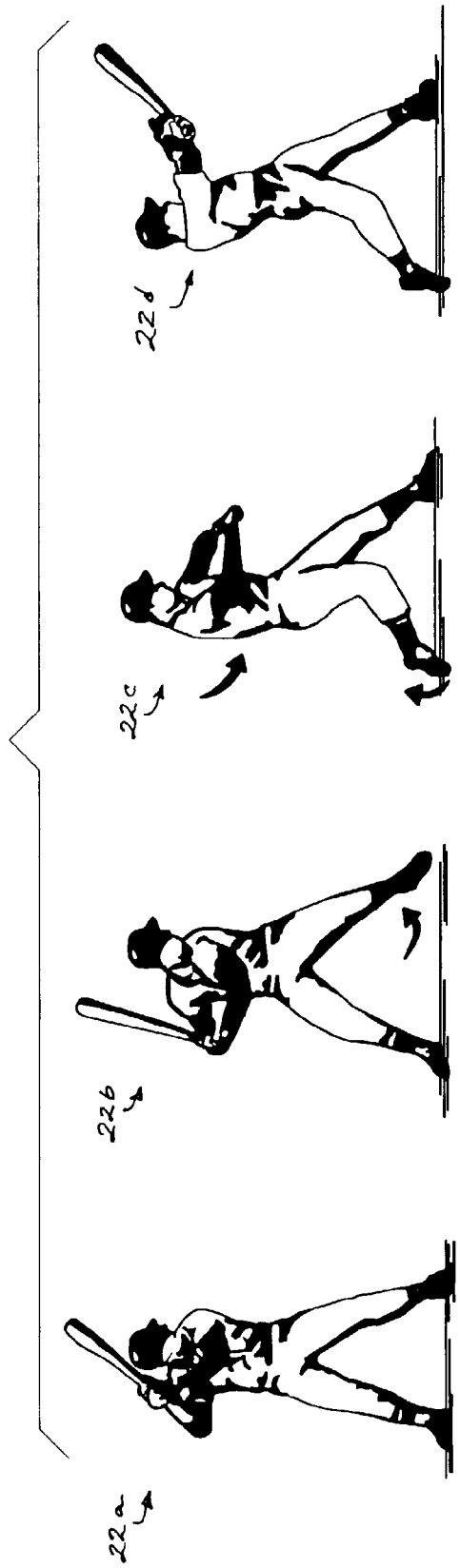

HITTING TRAINER

FIELD OF THE INVENTION

The present invention relates to equipment for teaching batting skills. In particular, the present invention relates to a kit for teaching young children how to bat at a baseball and, in particular, the kit can assist those children in learning baseball batting whose reading skills may not be sufficiently developed to read printed material.

BACKGROUND OF THE INVENTION

The popularity of baseball continues in the United States, and that popularity has been enhanced over the years by the institution of baseball leagues which cater to quite young children. The success of these leagues has been predicated upon the use of a stand upon which the baseball is placed to allow the batter to swing at a non-moving baseball. The advantages to use of such a stand to hold the ball while the batter swings are, at least, two fold: (1) the young batter can concentrate on the development of a reduced range of hand-eye coordination while swinging the bat at a non-moving object rather than a moving object; and (2) the young batter can concentrate on the mechanics of swinging the bat at the ball without having to divide his or her attention between the mechanics of swinging the bat and tracking the speed and direction of travel of a baseball.

While a number of patents exist which assist a baseball pitcher in learning how to grasp the baseball for various pitchers, such as U.S. Pat. No. 5,407,193 to McGinley, the Applicant is unaware of any kits which have been developed which provide the young batting student with the baseball equipment and instructions to allow the batting student or user to study the mechanics of swinging a bat and/or which provides the younger student whose reading skills are not well developed with a sequence of illustrated movements showing the proper technique for swinging a bat.

Therefore, it is an object of the present invention to supply batting students with a kit which provides all the needed equipment and instructional material to instruct the user regarding the swinging of a bat.

Another object of the present invention is to provide the user with instructions on the swinging of a bat and the hitting of a baseball which are in the form of illustrations and/or in the form of written materials.

It is another object of the present invention to provide young batters whose reading skills are not developed with illustrations of a sequence of movements showing the proper form used in swinging a bat.

It is another object of the present invention to provide the user with a kit which includes the equipment and instructions for teaching the user to properly swing at a baseball and which provides the user with a baseball having indicia or finger placement positions printed on the ball to assist the user in throwing the baseball.

It is yet another object of the present invention to provide baseball batting equipment and instructions on batting which are held within a single kit which is reusable by the user to store the equipment of the kit when not in use.

SUMMARY OF THE INVENTION

The foregoing objects are accomplished in a kit which provides the user or batting student with the equipment needed to practice swinging a bat at a baseball and which provides instructional material to teach the user how to swing a bat at a baseball. The present invention, more specifically, may include various combinations in the kit; the combinations comprising material selected from a casing, a bat, a ball, a ball having finger placement positions on the ball to teach the user how to throw a pitch, an instructional booklet teaching the user how to hit a baseball and/or a set of illustrations on the bat which the user may use as a reminder of the sequence of motions used to swing the bat and/or a set of written descriptions printed on the bat which allow the user having sufficient reading skills to review in writing the activities involved in swinging a bat.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 1 shows the kit of the present invention in elevational view and showing the kit assembled into the kit case;

FIG. 2 shows the kit of FIG. 1 in an exploded view and showing each of the components of the kit and the openable and closeable case;

FIG. 3 is an enlarged view of the circled portion of FIG. 1 and shows the illustrated description of the sequence of events for proper swinging of a bat and also shows a written description of each of the steps involved in swinging a bat, the illustrations and writing being an enlarged view of the illustrations and writing on the bat of FIG. 1.

DESCRIPTION OF THE PREFERRED EMBODIMENT

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted a limiting, but merely as a basis for the claims and as a representative basis for teaching one skilled in the art to variously employ the present invention in virtually any appropriately detailed structure.

Referring now to FIG. 1, kit 10 of the present invention is shown with the various components of the kit contained by or attached to or enclosed by kit casing 12. It will be appreciated by those skilled in the art that while in this preferred embodiment of the present invention, the ball and written instructions are enclosed within case 12 and bat 14 hangs down from case 12 through a hole provided in case 12 that other alternative arrangements of containing the various materials of kit 10 together can be substituted for case 12 of the present embodiment. Therefore, the particular case and the particular manner in which the various items of kit 10 are assembled or contained or held or connected to case 12 should not be considered a limitation and those skilled in the art will be able to devise alternative kit case structures for holding the kit materials in a single assemblage.

Still referring to FIG. 1, kit 10 is comprised of case 12 which contains bat 14 and ball 16 and label 18 and instructional booklet 20 (FIG. 2). Again referring to FIG. 1, bat 14 of kit 10 further includes batting instructional sequence illustrations 22 which are printed on the bat and written description 24 of the steps involved in batting which also are printed on bat 14.

Referring now to FIG. 2, the various components of kit 10 will be described in greater detail. Bat 14 is held in or connected to case 12 by molded indent 11 of case 11 (shown in FIG. 2 as 11a, 11b) which captures the tail of the bat within case 12. Bat 14 is a standard baseball bat which can be of wood or metal construction. The bat, as is shown in FIG. 1, further includes illustrations 22 showing the sequence of movements for proper batting swing which allows the user to quickly review the movements at the plate.

In particular, the illustrations allow a user who is not at a strong reading level to review the batting movements graphically. This feature is of particular importance due to the age of the children using the invention. These children are in the age group of four to six years old and may not have reading skills or do not have well developed reading skills. The graphic presentation of the steps of proper hitting or batting allow these young batters to review the steps of hitting a baseball without the need to read text to understand and review the sequence of steps for striking a baseball. In addition, the presentation of the illustrations on the bat allow the young hitter the chance to quickly review just prior to batting. Bat 14, as shown in FIG. 1, further includes written description 24 which describes the activities associated with each of the illustrated steps 22. Written description 24 is provided so users who are sufficiently skilled in reading can review just before batting the proper steps for hitting a baseball.

Referring again to FIG. 2, kit 10 also includes ball 16. Ball 16 is held within ball indent 26a, 26b which is formed in case 12. Ball 16 is provided so the user will have a ball to place on a ball stand, often known as a "T-ball" stand. To assist the user in learning other aspects of the game of baseball, ball 16 is provided with finger placement positions 28 which are imprinted on ball 16. Finger placement positions 28 teach the user the proper finger placement positions for holding ball 16 to allow the user to throw a _____ [Mike, what pitch is on the ball]_____ pitch. For display purposes, case 12 is provided with label 30 which, while not part of the present invention, is inserted into the kit to attract consumer attention.

Still referring to FIG. 2, case 12 is comprised of back case portion 32 and front case portion 34. Back portion 32 and front portion 34 are hingedly connected by hinge connection 36 at the base of case 12. The hinge connection between back portion 32 and front portion 34 allows the user to repeatedly open and shut case 12 for accessing the materials for use and for replacing the materials of kit 10 for storage. Case 12 can be maintained in a closed position by the capture of button 38a in receptacle 38b. Button 38a resides on back portion 32 of case 12 and receptacle 38b resides on front portion 34 of case 12. Frictional capture of button 38a within receptacle 38b maintains case 12 in a closed position and allows the user to open and close case 12 at will. Also included in case 12 is instruction booklet 20. Instruction booklet 20 includes written description of batting technique and photographs of positions used during batting technique to assist the young batter in developing their technique of hitting the baseball. Instructional booklet 20 provides the child having more advanced reading skills the ability to more closely study hitting technique and to understand the fundamentals, through written description, of the steps in properly striking a baseball. Instructional booklet 20 also is of assistance to the batting student that does not have developed reading skills as the sequence of photos and drawings included in instructional booklet 20 can assist the younger batting student in understanding the steps to proper batting.

Referring now to FIG. 3, an enlarged version of FIG. 22 on bat 14 in FIG. 1 and text 24 on bat 14 in FIG. 1 is shown. On bat 14 (FIG. 1), the user is provided with a sequence of FIGS., 22a, 22b, 22c, 22d, which shown the proper batting technique. This sequence of figures is of use to the younger batter who is not capable of reading complete text and is able to use FIGS. 22a–d to review the steps to proper batting just prior to stepping up to the plate and striking the ball. The younger batter is shown in FIG. 22a the proper stance for addressing the ball with the feet being approximately shoulder width apart and parallel to home plate and the hands shoulder high in preparation for addressing the ball. The younger batter can then examine the second figure FIG. 22b and review that as the ball approaches, weight is shifted to the back leg and the front leg comes up slightly as a short step is taken towards the pitcher. The young batter can then review FIG. 3 which shows the bat being brought around and the hands being brought through to swing on the path of the bat and the back leg and foot twisting against the ground. Finally, in FIG. 4, the young batter is shown the proper follow through with the arms extended outwardly as the bat head moves around and is shown the desired high finish with the bat above the shoulders. This sequence of batting illustrations is particularly important for the young batter who is going to be using the hitting training device of the particular invention. These batters will be of an age for which their reading skills are not developed, and the ability to quickly review the sequence of events on the bat as they approach the ball is of importance to the young batter. Further, the sequence of illustrations allows not only the young batter, but the batter that is not fluent in English to review the hitting steps just prior to addressing the ball.

Also included on bat 14 and below each illustration 22a–d is a written description which can be reviewed by the slightly older batting student. These written descriptions allow the batting student that is capable of reading them to quickly review a more detailed analysis of the approach to hitting the baseball and to better understand each of the features being shown in FIGS. 22a–d.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive hitting training kit is constructed and used, the characteris- tics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A kit for training a user to hit a baseball, the kit comprising:
    a casing,
    a bat, connected to said casing,
    a ball, connected to said casing, and
    a set of instructional illustrations on said bat, of a sequence of user movements for batting a ball.

2. The kit as claimed in claim 1 further comprising an instructional booklet connected to said casing, said booklet providing instructions to the user on the hitting of a baseball with said bat.

3. The kit as claimed in claim 1 further comprising a set of finger placement positions printed on said ball to teach the user how to grasp a baseball to throw a pitch with said ball.

4. The kit as claimed in claim 1 further comprising a set of written descriptions of said sequence of user movements said descriptions being printed on said bat.

5. The kit as claimed in claim 3 further comprising an instructional booklet connected to said casing, said booklet providing instructions to the user on the hitting of a baseball with said bat.

6. The kit as claimed in claim 3 further comprising a set of written descriptions of said sequence of user movements said descriptions being printed an said bat.

7. A kit for training a user to hit a baseball, the kit comprising:
    a casing,
    a bat, connected to said casing,
    a ball, connected to said casing
    a set of finger placement positions printed on said ball to teach the user how to grasp a baseball to throw a pitch with said ball,
    a set of written descriptions of said sequence of user movements said description being printed on said bat,
    an instructional booklet connected to said casing, said booklet providing instructions to the user on the hitting of a baseball with said bat, and
    a set of instructional illustrations on said bat of a sequence of user movements for batting a ball.

8. A kit for training a user to hit a baseball, the kit comprising:
    a casing,
    a bat, connected to said casing,
    a ball, connected to said casing,
    a set of finger placement positions printed on said ball to teach the user how to throw a pitch with said ball,
    an instructional booklet connected to said casing, said booklet providing instructions to the user on the hitting of a baseball with said bat, and
    a set of written descriptions of a sequence of user movements for batting a bail on said bat.

\* \* \* \* \*

UNITED STATES PATENT AND TRADEMARK OFFICE
CERTIFICATE OF CORRECTION

| | | |
|---|---|---|
| PATENT NO. | : 7,059,862 B2 | Page 1 of 1 |
| APPLICATION NO. | : 10/175647 | |
| DATED | : June 13, 2006 | |
| INVENTOR(S) | : McGinley, Michael L. | |

It is certified that error appears in the above-identified patent and that said Letters Patent is hereby corrected as shown below:

Column 6, line 3, delete the word --an-- after the word "printed" and insert the word "on" before the word "said."

Column 6, line 31, delete the word --bail-- after the word "a" and insert the word "ball" before the word "on."

Signed and Sealed this

Twenty-second Day of August, 2006

JON W. DUDAS
*Director of the United States Patent and Trademark Office*